US008648560B2

(12) United States Patent
Matsushita et al.

(10) Patent No.: US 8,648,560 B2
(45) Date of Patent: Feb. 11, 2014

(54) ELECTRIC MOTOR CONTROL APPARATUS

(75) Inventors: Masaki Matsushita, Tokyo (JP); Takayuki Kifuku, Tokyo (JP); Yasuaki Hori, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 643 days.

(21) Appl. No.: 12/749,945

(22) Filed: Mar. 30, 2010

(65) Prior Publication Data

US 2011/0074329 A1    Mar. 31, 2011

(30) Foreign Application Priority Data

Sep. 28, 2009    (JP) .................................. 2009-222555

(51) Int. Cl.
*H02P 7/00*        (2006.01)
*G01R 19/00*       (2006.01)

(52) U.S. Cl.
USPC ............................... 318/432; 318/798; 361/31

(58) Field of Classification Search
USPC ............. 318/400.01, 400.02, 400.04, 400.29, 318/798, 801, 432–434; 361/23, 24, 30, 31
See application file for complete search history.

(56) References Cited

U.S. PATENT DOCUMENTS

| 7,040,450 | B2 | 5/2006 | Nagase et al. | |
| 7,423,397 | B2 * | 9/2008 | Katahira | 318/432 |
| 7,560,897 | B2 * | 7/2009 | Watanabe | 318/811 |
| 7,880,425 | B2 * | 2/2011 | Welchko et al. | 318/722 |
| 7,906,925 | B2 * | 3/2011 | Takeuchi | 318/400.38 |
| 2006/0097676 | A1 * | 5/2006 | Katahira | 318/432 |
| 2009/0079372 | A1 * | 3/2009 | Takeuchi | 318/400.04 |

FOREIGN PATENT DOCUMENTS

| JP | 3-186477 A | | 8/1991 |
| JP | 8-175405 A | | 7/1996 |
| JP | 08175405 A | * | 7/1996 |
| JP | 10-132869 A | | 5/1998 |

OTHER PUBLICATIONS

Japanese Office Action issued in corresponding Japanese application No. 2009-222555 on Aug. 2, 2011.

* cited by examiner

*Primary Examiner* — Eduardo Colon Santana
(74) *Attorney, Agent, or Firm* — Sughrue Mion, PLLC

(57) ABSTRACT

In an electric motor control apparatus, an electric motor driving unit includes: a current detection unit configured to detect a current flowing through a current detection place in the electric motor driving unit. A control unit includes a current calculation unit configured to calculate a current value of a current flowing through an electric motor from an offset correction value obtained based on a first detection value detected at a time when a current flows through the current detection place and a second detection value detected at a time when a current does not flow through the current detection place. The offset correction value includes: a first offset correction value stored in nonvolatile memory of the control unit at a time of assembling the electric motor control apparatus; and a second offset correction value computed by the control unit while the electric motor is driven.

12 Claims, 8 Drawing Sheets

ELECTRIC MOTOR CONTROL APPARATUS

CROSS-REFERENCE TO RELATED APPLICATIONS

This application claims priority from Japanese Patent Application No. 2009-222555 filed on Sep. 28, 2009, the entire contents of which are incorporated herein by reference.

BACKGROUND OF THE INVENTION

1. Field of the Invention

The present invention relates to an electric motor control apparatus, and particularly to an electric motor control apparatus for controlling an electric motor so as to improve current detection accuracy.

2. Description of Related Art

Conventionally, in current detection of an electric motor, a current detection resistor such as a shunt resistor is connected in series with the electric motor and the current detection is performed based on a voltage occurring across this current detection resistor. As means for correcting an offset occurring by characteristic variations in a circuit element constituting this current detection means, a current detection circuit described in JP-A-3-186477 is proposed. The current detection circuit described in JP-A-3-186477 is a circuit for correcting an offset by associating a current detection signal detected when an electric motor is not driven with a state in which an electric motor current is zero.

Further, JP-A-10-132869 describes a current detection apparatus includes a bridge circuit including three switching element groups and shunt resistors connected to common sides of the switching elements located on negative sides of two of the switching element groups. In the current detection apparatus of JP-A-10-132869, a voltage across the shunt resistor at the time of turning off the switching element connected to the shunt resistor is used for the offset correction. In the offset correction described in JP-A-10-132869, an offset occurring depending on temperature characteristics and characteristic variations in a circuit element constituting current detection means can be corrected in real time.

SUMMARY OF THE INVENTION

In the current detection circuit described in JP-A-3-186477, correction of an offset at the time when an electric motor is not driven can be made as described above. However, a deviation of an offset occurring depending on temperature characteristics of a circuit element in a state of driving the electric motor cannot be corrected. On the other hand, in the current detection apparatus described in JP-A-10-132869, an offset occurring depending on temperature characteristics and characteristic variations in a circuit element constituting current detection means can be corrected in real time. However, since both the offsets occurring depending on temperature characteristics and characteristic variations in the circuit element are corrected in real time, a possible value of an offset correction value becomes large, and, for example, when noise is superimposed on a waveform of a voltage across a shunt resistor at the time of turning off a switching element by a switching operation of a bridge circuit at the time of driving an electric motor, updating of a large amount of deviation including this noise as the offset correction value is permitted, which results in the deterioration of current detection accuracy. Therefore, an influence on the electric motor by erroneously learning the offset correction value becomes large.

Also, the offset correction value is stored in memory and when the memory is damaged, the offset correction value stored in the memory becomes indefinite and becomes an unreliable value, so that a correction value has to be set at 0 when abnormality is detected in the offset correction value. Since a possible value of the offset correction value is large as described above, a change range of the offset correction value is large before and after damage to the memory and current detection accuracy deteriorates greatly, so that there was also a problem that an influence on the electric motor at the time of damage to the memory is also large.

The invention was made in view of the above circumstances, and an object of the invention is to provide an electric motor control apparatus capable of reducing an influence on an electric motor in the case of erroneously learning an offset correction value and correcting an offset occurring depending on temperature characteristics in real time while correcting an offset occurring depending on characteristic variations in a circuit element constituting current detection means.

According to an aspect of the invention, there is provided an electric motor control apparatus comprising: an electric motor; an electric motor driving unit configured to drive the electric motor; and a control unit configured to control the electric motor driving unit, wherein the electric motor driving unit comprises: a current detection unit configured to detect a current flowing through a current detection place provided in the electric motor driving unit, wherein the control unit comprises a current calculation unit configured to calculate a current value of a current flowing through the electric motor from an offset correction value obtained based on a first detection value detected at a time when a current flows through the current detection place and a second detection value detected at a time when a current does not flow through the current detection place, and wherein the offset correction value includes: a first offset correction value stored in non-volatile memory of the control unit at a time of assembling the electric motor control apparatus; and a second offset correction value computed by the control unit while the electric motor is driven.

DETAILED DESCRIPTION OF THE EMBODIMENTS

First Embodiment

Figure 1:
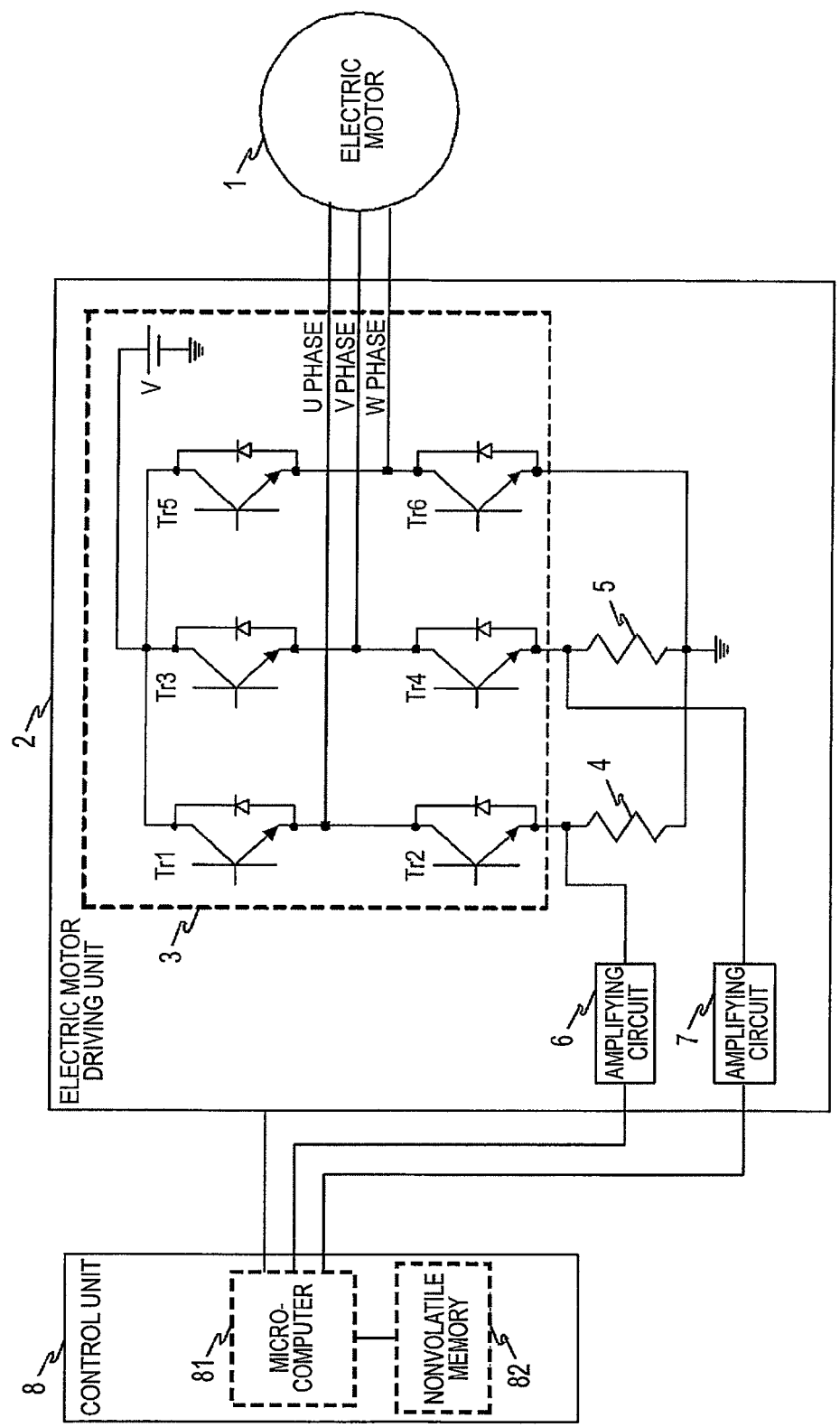
FIG. 1 is a block diagram showing a configuration of an electric motor control apparatus according to a first embodiment of the invention.

FIG. 1 is a block diagram showing a configuration of an electric motor control apparatus according to a first embodiment of the invention. In FIG. 1, an electric motor driving unit 2 for driving an electric motor 1 which is a three-phase motor includes: a bridge circuit 3 including six switching elements Tr1 to Tr6, resistors 4, 5 connected in series between GND and the switching elements Tr2, Tr4 which are connected on low potential sides of two of switching element groups of this bridge circuit 3; and amplifying circuits 6, 7 for amplifying voltages across the resistors 4, 5, respectively. A control unit 8 configured to control the electric motor driving unit 2 includes: a microcomputer 81 for incorporating an A/D converter etc. for digitizing and detecting the voltages across resistors after amplification outputted from the amplifying circuits 6, 7; and nonvolatile memory 82 configured to store various information such as an offset correction value. The control unit 8 performs detection of a current flowing through the electric motor 1, current calculation, etc. based on the offset correction value and a current value detected. In addition, hereafter, the same numerals show the same portions in each of the drawings.

Figure 2:
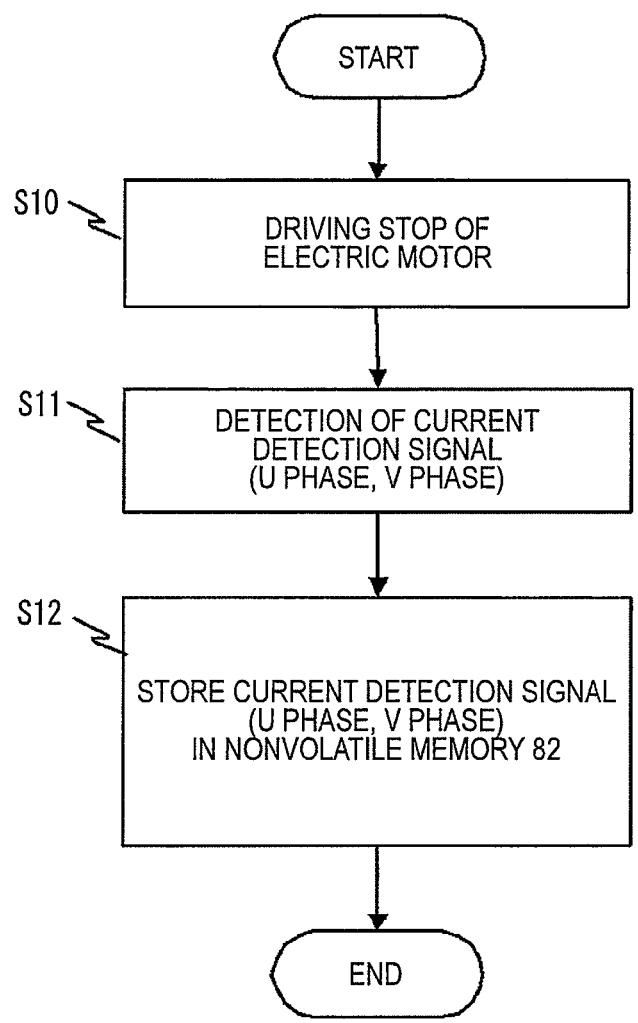
FIG. 2 is a flowchart showing a detection procedure of a first offset correction value of the electric motor control apparatus according to the first embodiment of the invention.
Figure 3:
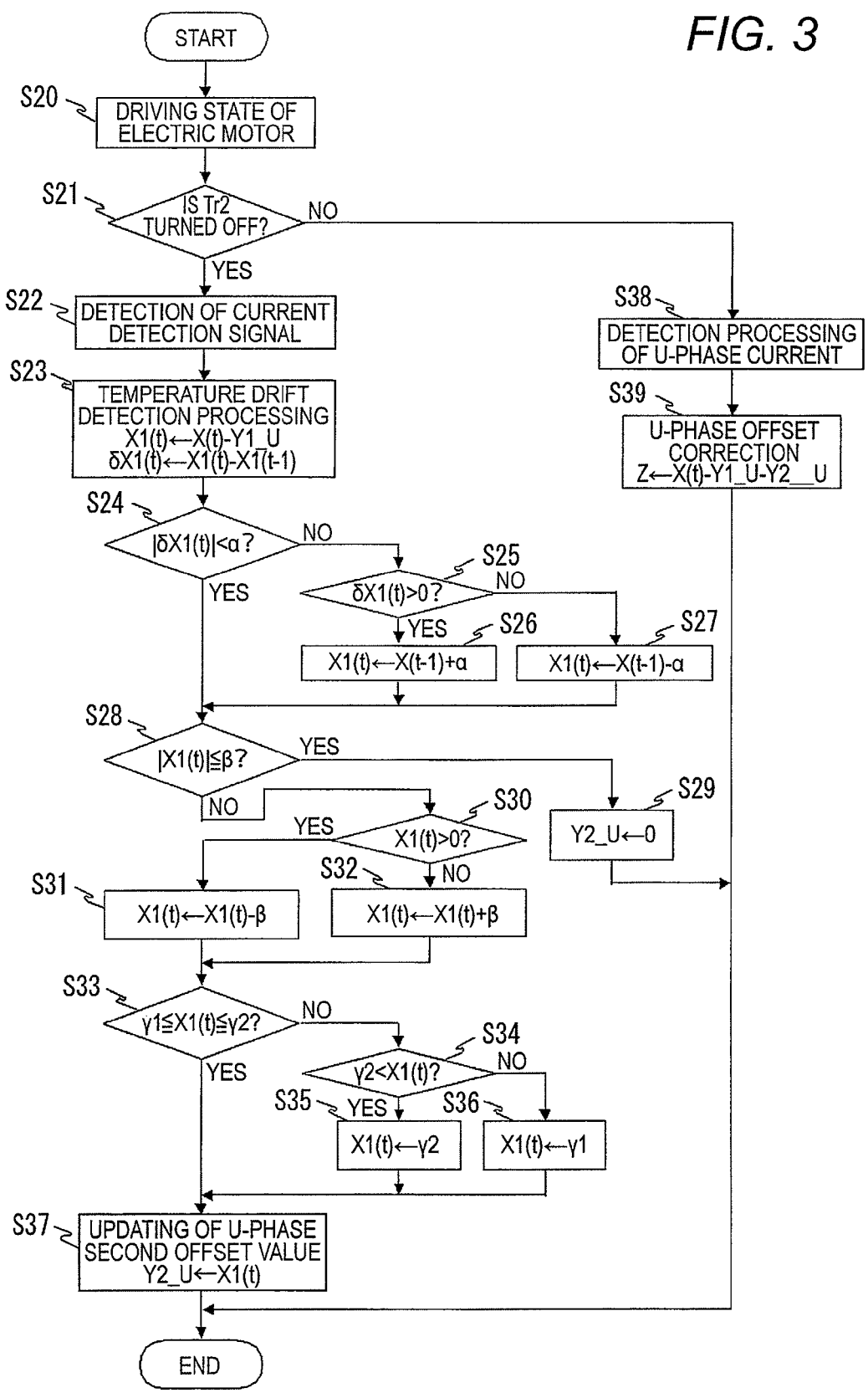
FIG. 3 is a flowchart showing a current detection procedure of the electric motor control apparatus according to the first embodiment of the invention.
Figure 4:
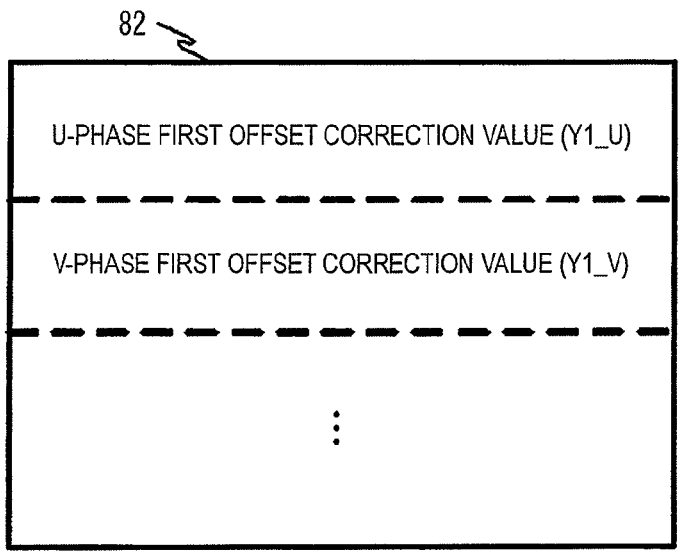
FIG. 4 is one example of offset information stored in non-volatile memory in the electric motor control apparatus according to the first embodiment of the invention.

Next, an operation of the electric motor control apparatus according to the first embodiment of the invention will be described. FIGS. 2 and 3 are flowcharts showing an operation of the electric motor control apparatus shown in FIG. 1, and FIG. 4 is one example of offset information stored in the nonvolatile memory 82, and is constructed of nonvolatile memory such as EEPROM and a first offset correction value is stored. FIG. 4 shows the case of storing a U-phase first offset correction value (Y1_U) and a V-phase first offset correction value (Y1_V) obtained by performing the flowchart shown in FIG. 2 only once under thermoneutral environment at the time of assembling the electric motor control apparatus in the nonvolatile memory 82 as an example. First, a detection procedure of a first offset correction value obtained at the time of assembling the electric motor control apparatus will be described with reference to the flowchart shown in FIG. 2.

In S10, by turning off the six switching elements Tr1 to Tr6, a current flowing through the electric motor 1 is broken and the electric motor 1 is put in a driving stop state. Subsequently, in S11, current detection signals outputted from the amplifying circuits 6, 7 are detected through the A/D converter incorporated into the microcomputer 81. In addition, a current detection value detected herein is an offset occurring in each of the U phase and the V phase under thermoneutral environment at the time of assembling the electric motor control apparatus, and is a value specific to an individual circuit occurring by characteristic variations etc. in a circuit element constituting current detection means. In S12, the current detection signals obtained in S11 are stored in the nonvolatile memory 82 as the U-phase first offset correction value Y1_U and the V-phase first offset correction value Y1_V as shown in FIG. 4.

Subsequently, an operation of the electric motor control apparatus shown in FIG. 1 and a detection procedure of a second offset correction value obtained while the electric motor is driven will be described with reference to the flowchart shown in FIG. 3.

In S20, the electric motor 1 is put in a driving state by PWM control. Concretely, a voltage generated by a PWM control signal outputted from the control unit 8 and inputted to input terminals of the six switching elements Tr1 to Tr6 is supplied to the electric motor 1 and driving control of the electric motor 1 is performed. In addition, the PWM control is performed by a well-known method.

In S21, it is determined whether the switching element Tr2 is turned on or off. An example of this embodiment shows the case of controlling the switching element Tr2 by the PWM control signal, and in this case, a reference signal and a triangular waveform generated by up and down of count of a counter value of the inside of the microcomputer 81 are inputted to a comparator and when the triangular waveform is larger than the reference signal, the switching element Tr2 is turned on and when the triangular waveform is smaller than the reference signal, the switching element Tr2 is turned off, so that it can be determined whether the switching element Tr2 is turned on or off based on a large and small relation between the triangular waveform and the reference signal. When the switching element Tr2 is turned on, detection processing of a U-phase current flowing through the electric motor 1 is performed (S38). The U-phase current detected herein is a first detection value detected at the time when a current flows through the resistor 4 which is a current detection place. When the switching element Tr2 is turned off, a current detection signal is detected (S22) and in S23 or later, a U-phase second offset correction value (Y2_U) is updated based on the U-phase first offset correction value (Y1_U) and the current detection signal obtained in S22. The current detection signal detected herein is a second detection value detected at the time when a current does not flow through the resistor 4 which is the current detection place.

In S22, detection processing of a current detection signal X(t) is performed. When the switching element Tr2 is turned off, a current does not flow through the resistor 4 which is the detection place, so that a voltage across the resistor is also zero. Therefore, when the switching element Tr2 is turned off, an offset value of a current detection is outputted from the A/D converter incorporated into the microcomputer 81. In addition, the offset value outputted herein is an offset value occurring depending on temperature characteristics and characteristic variations in a circuit element constituting current detection means. Hence, processing (temperature drift detection processing) for subtracting the U-phase first offset correction value Y1_U stored in the nonvolatile memory 82 from the second detection value is performed in S23.

In S23, the temperature drift detection processing is performed based on the U-phase first offset correction value Y1_U and the second detection value X(t) at time t. Concretely, a deviation $X1(t)$ occurring depending on temperature characteristics is calculated based on the following formula (1). Also, a difference $\delta X1(t)$ between the deviations $X1(t)$ and $X1(t-1)$ is calculated based on a formula (2).

$$X1(t) \leftarrow X(t) - Y1\_U \quad (1)$$

$$\delta X1(t) \leftarrow X1(t) - X1(t-1) \quad (2)$$

Here, an arrow shows substitution processing. Also, X(t) is a current detection signal obtained in S22 and is a detection value (second detection value) outputted from the A/D converter incorporated into the microcomputer 81 when the switching element Tr2 is turned off, and X1(t) is an offset detection value occurring depending on temperature characteristics of a circuit element. Also, δX1(t) is a value indicating the amount of difference between X1(t) and X1(t=1). Subsequently, the flowchart proceeds to S24 and processing for limiting X1(t) so that a time change amount (that is, |δX1(t)|) of the detection value X1(t) becomes smaller than a predetermined value (α) is performed.

In S24, it is determined whether or not the time change amount |δX1(t)| of the detection value X1(t) calculated in S23 is smaller than the predetermined value (α), and in the case of determining that |δX1(t)| is smaller than α, the flowchart proceeds to S28 and in the other case, processing for determining whether or not δX1(t) is larger than 0 is performed (S25). In the case of determining that δX1(t) is larger than 0 in S25, a value of X1(t) is updated (S26) based on a formula (3) and in the other case, a value of X1(t) is updated (S27) based on a formula (4) and the flowchart proceeds to S28.

$$X1(t) \leftarrow X1(t-1) + \alpha \quad (3)$$

$$X1(t) \leftarrow X1(t-1) - \alpha \quad (4)$$

Here, a is an upper limit value of the time change amount δX1(t) of the detection value X1(t), and a value is set based on a temperature drift change rate of a previously assumed range. By setting the value of a in this manner, a change rate of an offset correction value can be limited within the previously assumed range even when noise is superimposed on a detection waveform.

In S28, processing for determining whether or not an absolute value of the detection value X1(t) is a predetermined value (β) or less is performed. In the case of determining that |X1(t)| is β or less, offset correction by a U-phase second offset correction value is not made, so that 0 is substituted into the U-phase second offset correction value Y2_U (S29) and the current detection processing is ended. In the case of determining that |X1(t)| is larger than β, processing for determining whether or not X1(t) is larger than 0 is performed (S30). In the case of determining that X1(t) is larger than 0 in S30, a value of X1(t) is updated (S31) based on a formula (5) and in the other case, a value of X1(t) is updated (S32) based on a formula (6) and the flowchart proceeds to S33.

$$X1(t) \leftarrow X1(t) - \beta \quad (5)$$

$$X1(t) \leftarrow X1(t) + \beta \quad (6)$$

In the formula (5) and formula (6), X1(t) of a right side shows a detection value before updating and X1(t) of a left side shows a detection value after updating. Also, β is a threshold value for determining whether or not offset correction by a second offset correction value is made, and is set at, for example, a value for deciding that a deviation by a temperature drift does not occur. By setting the value of β in this manner, when the value of |X1(t)| is the predetermined value (β) or less, the offset correction by the second offset correction value can be made only in the case of disposing a dead zone in which the offset correction by the second offset correction value is not made and detecting the detection value X1 of the dead zone or more.

In S33, processing for determining whether or not the detection value X1(t) is limited within a predetermined range (γ1 to γ2) is performed. In the case of determining that X1(t) is within the range of γ1≤X1(t)≤γ2, the flowchart proceeds to S37 and in the other case, processing for determining whether or not X1(t) is larger than γ2 is performed (S34). In the case of determining that X1(t) is larger than γ2 in S34, γ2 is substituted into X1(t) (S35) and in the other case, γ1 is substituted into X1(t) (S36) and the flowchart proceeds to S37. Here, γ1 is a lower limit value of the second offset correction value and γ2 is an upper limit value of the second offset correction value and, for example, a value corresponding to a temperature drift amount of a possible range in design. By setting the values of γ1 and γ2 in this manner, even when noise is superimposed on a detection waveform, it is possible not to update a large deviation including this noise as the offset correction value.

In S37, processing for updating the U-phase second offset correction value Y2_U is performed. Concretely, the second offset correction value Y2 is updated by substituting the detection value X1(t) into the U-phase second offset correction value Y2_U.

In S38, detection processing of a U-phase current of the electric motor 1 is performed. When the switching element Tr2 is turned on, a current flows through the resistor 4, so that the U-phase current of the electric motor 1 can be detected by measuring a voltage across this resistor. The U-phase current of the electric motor 1 detected in S38 is inputted to the inside of the control unit 8 together with the U-phase first offset correction value Y1_U and the U-phase second offset correction value Y2_U, and offset correction which is processing of the microcomputer 81 is made (S39).

In S39, offset correction based on the U-phase first offset correction value Y1_U and the U-phase second offset correction value Y2_U is made. Concretely, the offset correction is made based on the following formula (7).

$$Z \leftarrow X(t) - Y1\_U - Y2\_U \quad (7)$$

However, Z is a current detection value after offset correction. A current value and a direction of the U-phase current flowing through the electric motor 1 are obtained by the offset correction.

In addition, the case of detecting the U-phase current and the U-phase second offset correction value (Y2_U) based on an on/off state of the switching element Tr2 is shown herein, but by replacing the switching element Tr2 with the switching element Tr4 and replacing the U-phase first offset correction value Y1_U and the U-phase second offset correction value Y2_U with a V-phase first offset correction value Y1_V and a V-phase second offset correction value Y2_V respectively, a V-phase current and the V-phase second offset correction value (Y2_V) can be detected by a procedure similar to the above, so that detailed description is omitted.

As described above, the electric motor control apparatus according to the first embodiment of the invention is configured to make offset correction based on a first offset correction value stored in nonvolatile memory at the time of assembling the electric motor control apparatus and a second offset correction value computed by a control unit while an electric motor is driven, so that an offset occurring depending on temperature characteristics can be corrected in real time while correcting an offset occurring depending on characteristic variations in a circuit element constituting current detection means.

Also, an offset correction value is made so as to include a first offset correction value stored in nonvolatile memory at the time of assembling the electric motor control apparatus and a second offset correction value computed by a control unit while an electric motor is driven, so that when memory is damaged, the offset correction value varying in real time while the electric motor is used is conventionally initialized and current detection accuracy deteriorates greatly, but according to a configuration of the invention, even when the contents of one offset correction value of the first offset correction value and the second offset correction value are initialized, the contents of the other offset correction value are held, so that deterioration of current detection accuracy can be suppressed and an influence on the electric motor at the time of damaging the memory can be reduced than ever before.

Also, the electric motor control apparatus according to the first embodiment of the invention is configured so as to limit a second offset correction value so that a time change amount of a value in which a first offset correction value is subtracted from a second detection value X(t) detected as a voltage across the resistor of the resistor 4 at the time when an electric motor is driven and the switching element Tr2 is turned off becomes smaller than a predetermined value (α) based on a temperature drift change rate of a current detection unit. Therefore, the second offset correction value after limit becomes a value in an assumed range of the temperature drift change rate and a deviation of an offset occurring depending on temperature characteristics can be detected properly.

Also, the electric motor control apparatus according to the first embodiment of the invention is configured so that offset correction by a second offset correction value is not made when an absolute value of a value in which a first offset correction value is subtracted from a second detection value X(t) detected as a voltage across the resistor of the resistor 4 at the time when an electric motor is driven and the switching element Tr2 is turned off is β or less. Therefore, for example, by setting β at a value larger than a slight change range of a detection value other than a deviation of an offset by a temperature drift etc., the second offset correction value Y2 is not updated every time a detection value changes slightly by a factor other than a deviation of an offset occurring depending on temperature characteristics, and the deviation of the offset occurring depending on the temperature characteristics can be detected properly.

Further, the electric motor control apparatus according to the first embodiment of the invention is configured so that a value in which a first offset correction value is subtracted from a second detection value X(t) detected as a voltage across the resistor of the resistor 4 at the time when an electric motor is driven and the switching element Tr2 is turned off is limited within a predetermined range ($\gamma 1 \leq X1(t)-Y1 \leq \gamma 2$), so that, for example, by setting an upper limit value and a lower limit value of a value possible as a temperature drift correction value at $\gamma 2$ and $\gamma 1$, a second offset correction value after limit becomes a value in an assumed range of the value possible as the temperature drift correction value and even when noise of a value larger than the upper limit value $\gamma 2$ is superimposed on a detection waveform at this time, a large deviation including this noise is not updated as an offset correction value and a deviation of an offset occurring depending on temperature characteristics can be detected properly.

As described above, the first embodiment of the invention is configured to limit a second offset correction value, so that the second offset correction value becomes a value in a proper range and, for example, even when noise is superimposed, a large deviation including this noise is not updated as an offset correction value and an influence on an electric motor in the case of erroneously learning the offset correction value can be reduced.

In addition, in the first embodiment of the invention, the case where a time change amount of a second offset correction value is limited so as to become smaller than a predetermined value and a dead zone in which offset correction by the second offset correction value is not made is disposed and thereby the second offset correction value is limited and further the second offset correction value is limited within a predetermined range is shown, but it is not limited to this case, and any limit of the limits for the second offset correction value described above may be performed. Also, in the electric motor control apparatus according to the first embodiment of the invention, the case of passing an AC through a three-phase motor by performing PWM control of each switching element of a bridge circuit made of six switching elements is shown, but it is not limited to this, and as long as a configuration of memory in which offset information is stored is a configuration made of a first offset correction value stored in nonvolatile memory at the time of assembling the electric motor control apparatus and a second offset correction value computed by a control unit while an electric motor is driven in the electric motor control apparatus for detecting a current by offset correction, other portion may have a different configuration, for example, a DC is passed through a DC motor.

Second Embodiment

Figure 5A:
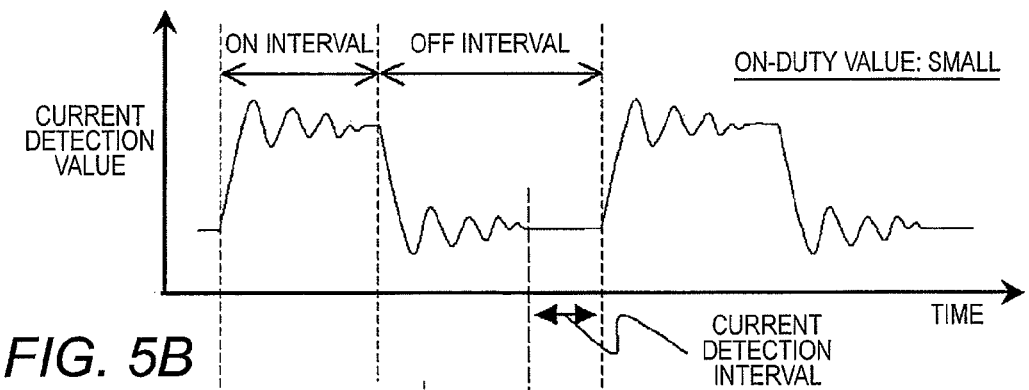
FIG. 5A is a diagram showing one example of a waveform detected in a resistor in an electric motor control apparatus for a case where on-duty value is small and according to a second embodiment of the invention.
Figure 5B:
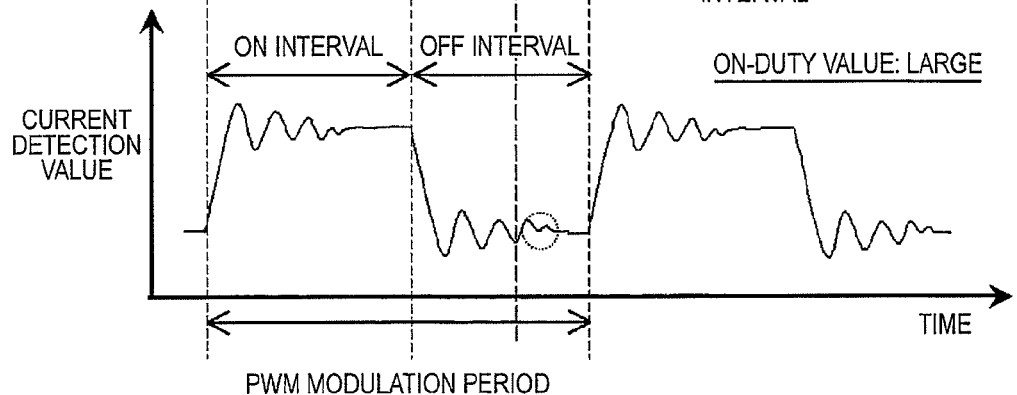
FIG. 5B is a diagram showing one example of a waveform detected in a resistor in an electric motor control apparatus for a case where on-duty value is large and according to a second embodiment of the invention.
Figure 6:
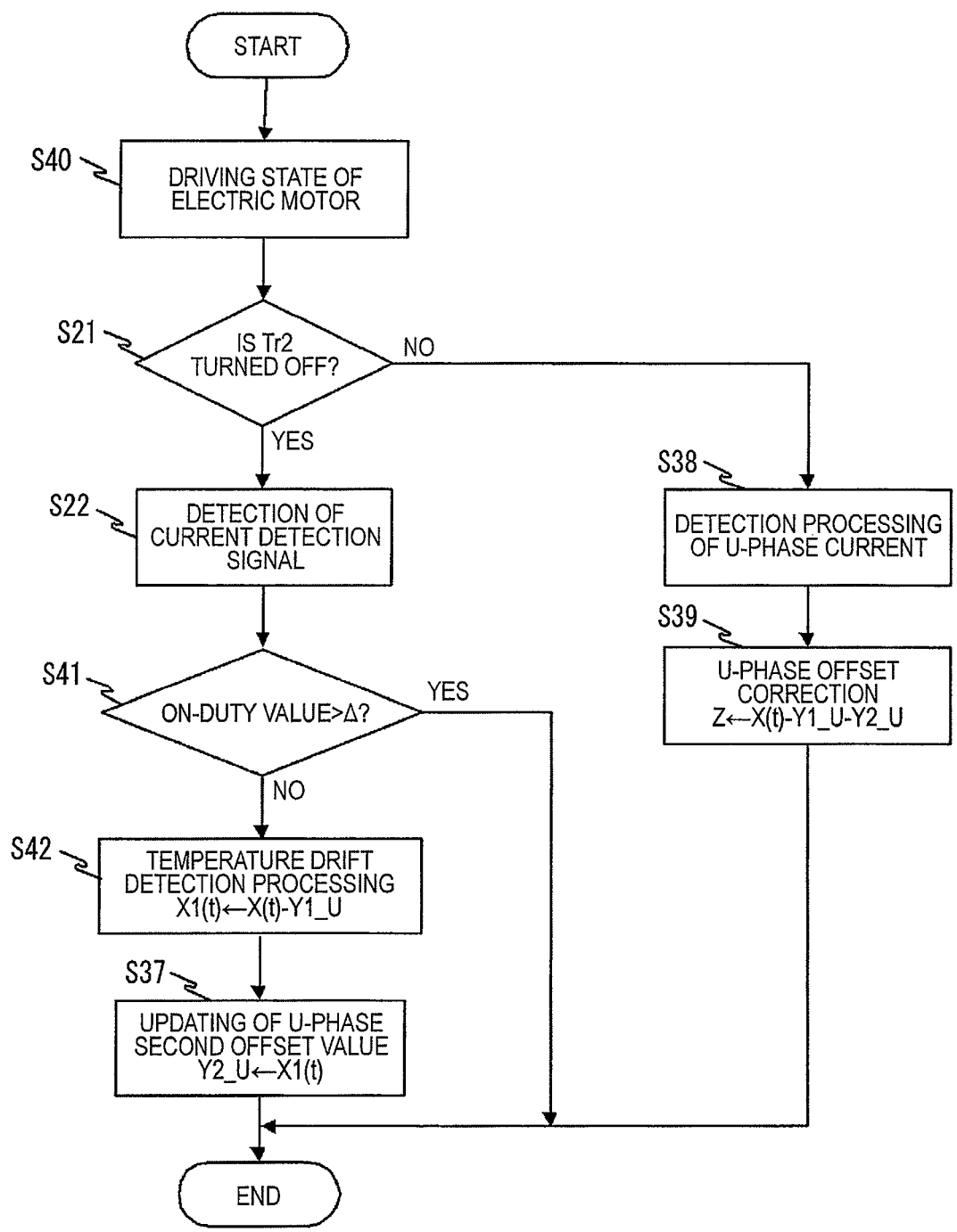
FIG. 6 is a flowchart showing a current detection procedure of the electric motor control apparatus according to the second embodiment of the invention.

FIG. 5 shows one example of a waveform detected in a resistor 4 in the electric motor control apparatus shown in FIG. 1, and the axis of abscissa shows time and the axis of ordinate shows a current detection value. Also, FIG. 5A shows the case where an on-duty value is small, and FIG. 5B shows the case where the on-duty value is large. Here, the on-duty value is a value indicating a percentage of an on interval among a PWM control signal and, for example, the value is 0% when a percentage of the on interval is 0, and is 50% when a percentage of the on interval is equal to a percentage of an off interval, and a percentage of the off interval becomes small as the on-duty value is large. In the electric motor control apparatus having the electric motor driving unit for driving the electric motor by PWM control shown in the first embodiment, for example, when the on-duty value which is a percentage of the on interval of the PWM control signal is small as shown in FIG. 5A, a detection value at a current detection interval within the off interval of the PWM control signal is constant. However, the PWM control signal is a pulse-shaped waveform and a waveform in which overshoot or undershoot occurs is detected as a detection waveform and when the on-duty value becomes large as shown in FIG. 5B, there was a problem that noise by the undershoot is included in the current detection interval and updating of a large deviation including this noise as an offset correction value is permitted and current detection accuracy deteriorates. Hence, by configuring not to update a second offset correction value when the on-duty value is a predetermined value or more, a large deviation including the noise by the undershoot is not updated as the offset correction value. In the second embodiment of the invention, a configuration of an offset correction value is the same configuration as the first embodiment and a second offset correction value is not updated when an on-duty value is a predetermined value or more. Its details will hereinafter be described. FIG. 6 is a flowchart showing an operation of an electric motor control apparatus according to the second embodiment of the invention. In addition, a block diagram of the electric motor control apparatus according to the second embodiment of the invention is the same as that of FIG. 1, so that its detailed description is omitted.

In FIG. 6, an electric motor 1 is put in a driving state by PWM control in S40. Concretely, a voltage generated by a PWM control signal outputted from a control unit 8 and inputted to input terminals of six switching elements Tr1 to Tr6 is applied to the electric motor 1 and driving control of the electric motor 1 is performed. In addition, the PWM control is performed by a well-known method.

In S41, processing for determining whether or not an on-duty value is a predetermined value (Δ) or more is performed. In the case of determining that the on-duty value is Δ or more, a second offset correction value is not updated and this current detection processing is ended. In the case of determining that the on-duty value is less than A, the flowchart proceeds to S42 and the second offset correction value is updated. Here, A is a threshold value for determining whether or not the second offset correction value is updated, and is set at, for example, an on-duty value in which even when noise by overshoot or undershoot is superimposed on a detection waveform, a large deviation including this noise is not updated as an offset correction value.

In S42, temperature drift detection processing is performed. Concretely, a deviation $X1(t)$ occurring depending on temperature characteristics is calculated based on the formula (1) described above.

As described above, according to the electric motor control apparatus according to the second embodiment of the invention, by driving a three-phase motor by controlling an on/off state of each switching element by a pulse width modulation signal with respect to a circuit configured by making bridge connection between three groups of switching elements and a second offset correction value is not updated when an on-duty value of the pulse width modulation signal is A or more, for example, even when noise by overshoot or undershoot is superimposed on a detection waveform, a large deviation including this noise is not updated as an offset correction value and a deviation of an offset occurring depending on temperature characteristics can be detected properly.

Third Embodiment

Figure 7:
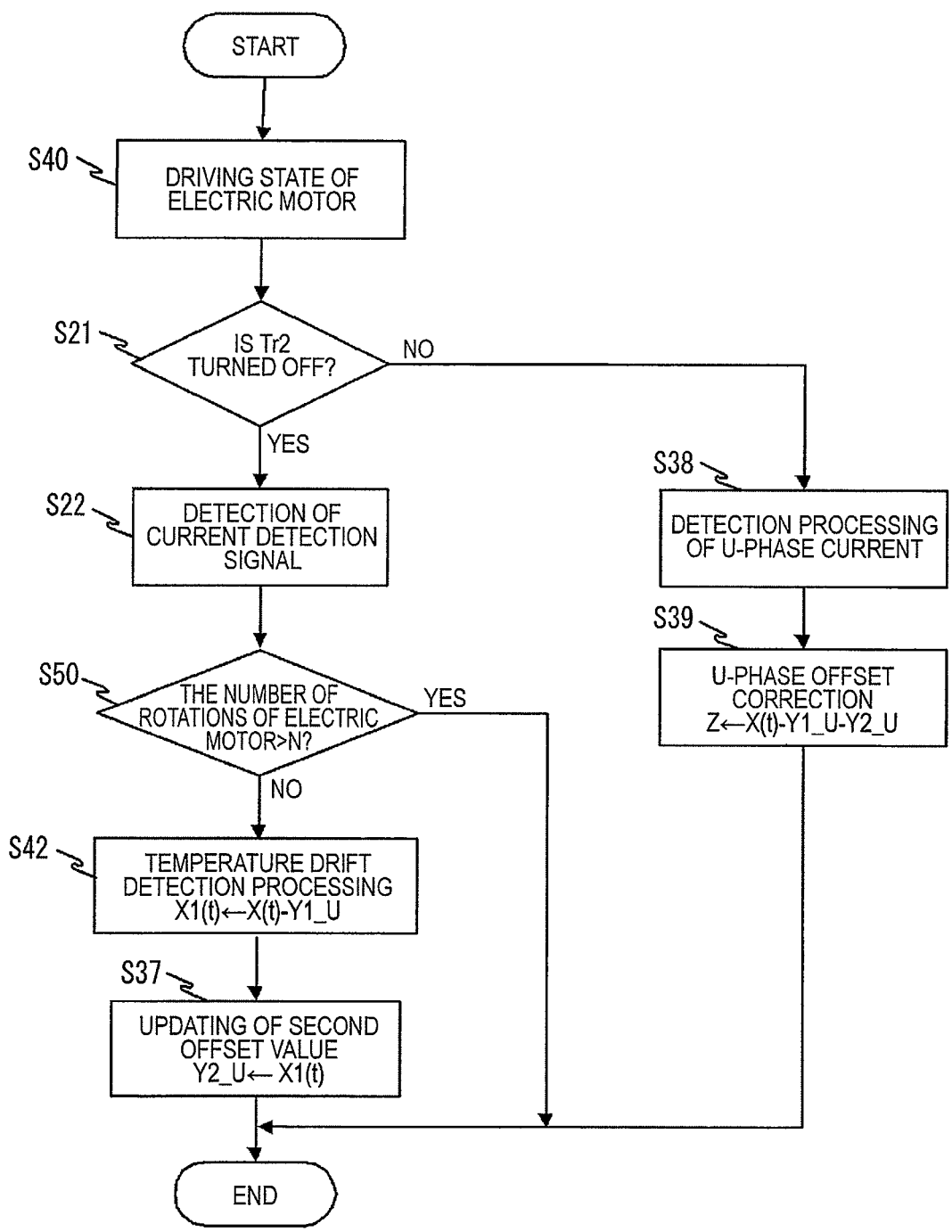
FIG. 7 is a flowchart showing a current detection procedure of an electric motor control apparatus according to a third embodiment of the invention.

FIG. 7 is a flowchart showing an operation of an electric motor control apparatus according to a third embodiment of the invention. In addition, a block diagram of the electric motor control apparatus according to the third embodiment of the invention is the same as that of FIG. 1 and a configuration of an offset correction value is the same as that of the first embodiment, so that its detailed description is omitted. In FIG. 7, processing for determining whether or not the number of rotations of an electric motor is a predetermined value (N) or more is performed in S50. Here, the number of rotations of the electric motor is a value calculated from a value etc. detected from a rotational angle sensor. When the electric motor rotates, back electromotive force is generated and as a rotational speed increases, more back electromotive force is generated, so that it is necessary to increase an on-duty value of a pulse width modulation signal and increase a voltage applied to the electric motor. Therefore, as the number of rotations of the electric motor is large, the on-duty value becomes large. In the case of determining that the number of rotations of the electric motor is N or more, a second offset correction value is not updated and this current detection processing is ended. In the case of determining that the number of rotations of the electric motor is less than N, the flowchart proceeds to S42 and the second offset correction value is updated. Here, N is a threshold value for determining whether or not the second offset correction value is updated, and is set at, for example, the number of rotations in which even when noise by overshoot or undershoot is superimposed on a detection waveform, a large deviation including this noise is not updated as an offset correction value.

As described above, according to the electric motor control apparatus according to the third embodiment of the invention, by driving a three-phase motor by controlling an on/off state of each switching element by a pulse width modulation signal with respect to a circuit configured by making bridge connection between three groups of switching elements and a second offset correction value is not updated when the number of rotations of an electric motor is N or more, the number of rotations of the electric motor is detected instead of calculating an on-duty value and the second offset correction value can be updated based on the number of rotations of this electric motor, so that an effect equal to that of the second embodiment can be obtained by a simpler configuration.

Fourth Embodiment

Figure 8A:
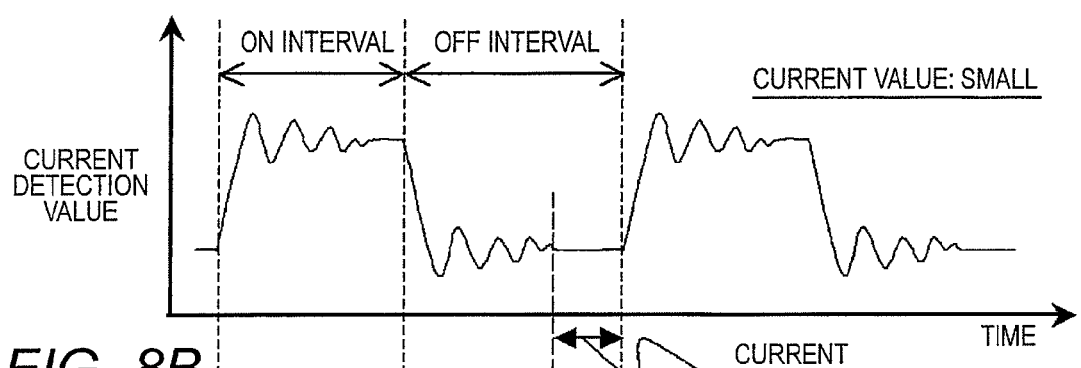
FIG. 8A is a diagram showing one example of a waveform detected in a resistor in an electric motor control apparatus for a case where current value is small and according to a fourth embodiment of the invention.
Figure 8B:
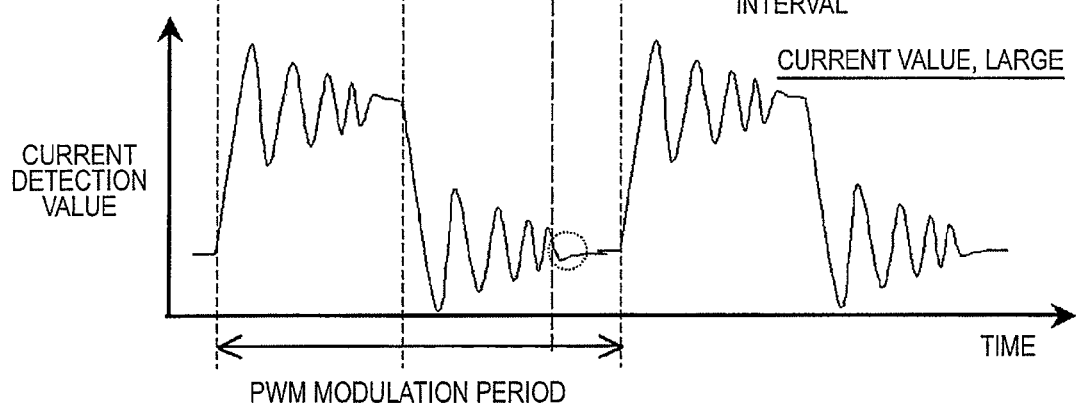
FIG. 8B is a diagram showing one example of a waveform detected in a resistor in an electric motor control apparatus for a case where current value is large and according to a fourth embodiment of the invention.
Figure 9:
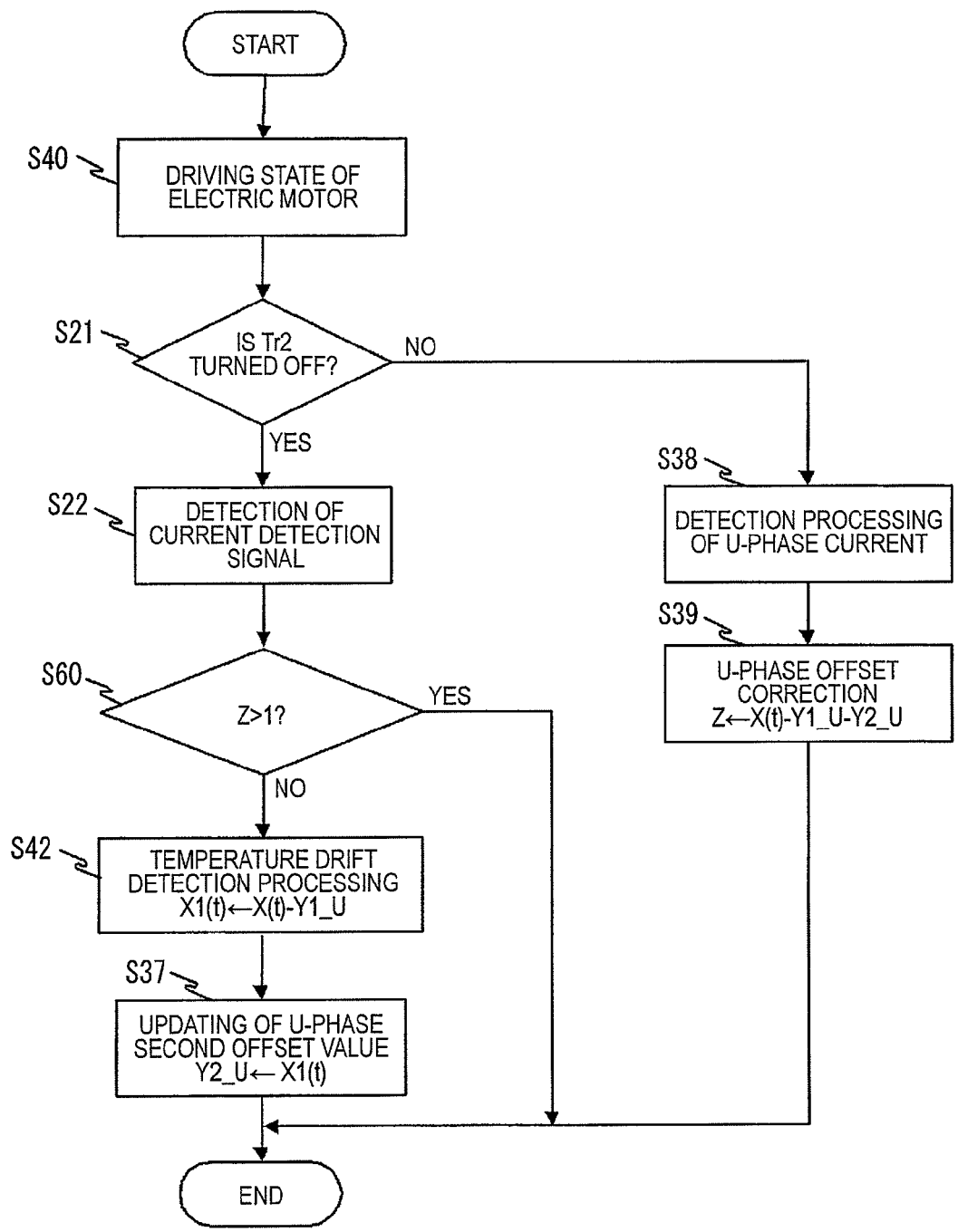
FIG. 9 is a flowchart showing a current detection procedure of the electric motor control apparatus according to the fourth embodiment of the invention.

FIG. 8 shows one example of a waveform detected in a resistor 4 in the electric motor control apparatus shown in FIG. 1, and the axis of abscissa shows time and the axis of ordinate shows a current detection value. Also, FIG. 8A shows the case where a current value flowing through an electric motor is small, and FIG. 8B shows the case where the current value flowing through the electric motor is large. When the current value flowing through the electric motor becomes large, a ripple of overshoot or undershoot becomes large as shown in FIG. 8B. When noise by this ripple is superimposed on a detection waveform, there was a problem that updating of a large deviation including this noise as an offset correction value is permitted and current detection accuracy deteriorates. Hence, by configuring so as not to update a second offset correction value when the current value flowing through the electric motor is a predetermined value or more, a large deviation including the noise by the ripple of the undershoot is not updated as the offset correction value. In a fourth embodiment of the invention, a configuration of an offset correction value is the same configuration as the first embodiment and a second offset correction value is not updated when the current value flowing through the electric motor is a predetermined value or more. Its details will hereinafter be described. FIG. 9 is a flowchart showing an operation of an electric motor control apparatus according to the fourth embodiment of the invention. In addition, a block diagram of the electric motor control apparatus according to the fourth embodiment of the invention is the same as that of FIG. 1, so that its detailed description is omitted.

In FIG. 9, processing for determining whether or not a current value (Z) of the electric motor is a predetermined value (I) or more is performed in S60. In the case of determining that Z is I or more, a second offset correction value is not updated and this current detection processing is ended. In the case of determining that Z is less than I, the flowchart proceeds to S42 and the second offset correction value is updated. Here, I is a threshold value for determining whether or not the second offset correction value is updated, and as the current value flowing through the electric motor becomes large, an influence which a ripple of overshoot or undershoot exerts on a detection waveform is large, so that I is set at, for example, a current value in which even when noise by the ripple of overshoot or undershoot is superimposed on the detection waveform, a large deviation including this noise is not updated as an offset correction value.

As described above, according to the electric motor control apparatus according to the fourth embodiment of the invention, by driving a three-phase motor by controlling an on/off state of each switching element by a pulse width modulation signal with respect to a circuit configured by making bridge connection between three groups of switching elements and a second offset correction value is not updated when a current value of an electric motor is I or more, for example, even when noise by a ripple of overshoot or undershoot is superimposed on a detection waveform, a large deviation including this noise is not updated as an offset correction value and a deviation of an offset occurring depending on temperature characteristics can be detected properly.

In addition, in the fourth embodiment of the invention, the case of performing processing for determining whether or not to perform updating using the current value Z after offset correction obtained by the current detection procedure is shown, but, for example, processing for determining whether or not to perform updating using a current value before offset correction or a target current value outputted from a control unit 8 in a current control apparatus based on feedback control may be performed.

Further, according to the electric motor control apparatus according to the second to fourth embodiments described above, by configuring an electric motor driving unit to drive a three-phase motor by controlling an on/off state of each switching element by a pulse width modulation signal with respect to a circuit configured by making bridge connection between three groups of switching elements and a resistor connected in series between a GND and the switching element on the low potential sides of two of the three groups of switching elements of the bridge circuit is set in a detection place and a current is detected, when the switching element connected to the low potential side is turned off, a current does not flow through the detection place and a detection value detected at this time becomes an offset, so that the offset occurring depending on temperature characteristics can be detected properly.

Also, in each of the electric motor control apparatus according to the second to fourth embodiments described above, it is decided whether or not a second offset correction value is updated based on the on-duty value of the pulse width modulation signal, the number of rotations of the electric motor, and the current value, but at least two or more of these may be combined.

In addition, in the electric motor driving unit of the electric motor control apparatus according to the second to fourth embodiments described above, the configuration of driving a three-phase motor which is an electric motor by performing PWM control of each switching element of a bridge circuit including three groups of switching elements is shown, but it is not limited to this. As long as a configuration of driving an electric motor by performing PWM control of each switching element of a bridge circuit including a plurality of groups of switching elements is used, for example, a configuration of driving a single-phase motor by performing PWM control of each switching element of a bridge circuit including two groups of switching elements may be used.

The embodiments of the present invention can provide an electric motor control apparatus capable of reducing an influence on an electric motor in the case of erroneously learning an offset correction value and correcting an offset occurring depending on temperature characteristics in real time while correcting an offset occurring depending on characteristic variations in a circuit element constituting current detection means.

The invention claimed is:

1. An electric motor control apparatus comprising:
an electric motor;
an electric motor driving unit configured to drive the electric motor; and
a control unit configured to control the electric motor driving unit,
wherein the electric motor driving unit comprises: a current detection unit configured to detect a current flowing through a current detection place provided in the electric motor driving unit,
wherein the control unit comprises a current calculation unit configured to calculate a current value of a current flowing through the electric motor from an offset correction value obtained based on a first detection value detected at a time when a current flows through the current detection place and a second detection value detected at a time when a current does not flow through the current detection place,
wherein the offset correction value includes: a first offset correction value stored in nonvolatile memory of the control unit at a time of assembling the electric motor control apparatus; and a second offset correction value computed by the control unit while the electric motor is driven, and
wherein a time change amount of the second offset correction value is limited so as to become smaller than a predetermined value based on a temperature drift change rate of the current detection unit.

2. The electric motor control apparatus according to claim 1, wherein the second offset correction value is limited within a predetermined range.

3. The electric motor control apparatus according to claim 1,
wherein the electric motor driving unit is configured to drive the electric motor by a pulse width modulation signal, and
wherein the second offset correction value is not updated when an on-duty value of this pulse width modulation signal is a predetermined value or more.

4. The electric motor control apparatus according to claim 1, wherein the second offset correction value is not updated when a number of rotations of the electric motor is a predetermined number or more.

5. The electric motor control apparatus according to claim 1, wherein the second offset correction value is not updated when the current value of the current flowing through the electric motor is a predetermined value or more.

6. The electric motor control apparatus according to claim 1,
wherein the electric motor driving unit comprises a bridge circuit comprising bridge-connected switching element groups,
wherein the electric motor driving unit is configured to drive the electric motor by controlling an on/off state of each switching element in the bridge circuit by a pulse width modulation signal, and
wherein the detection place is a resistor connected between a ground and a switching element of a low potential side in at least one of the switching element group.

7. An electric motor control apparatus comprising:
an electric motor;
an electric motor driving unit configured to drive the electric motor; and
a control unit configured to control the electric motor driving unit,
wherein the electric motor driving unit comprises: a current detection unit configured to detect a current flowing through a current detection place provided in the electric motor driving unit, wherein the control unit comprises a current calculation unit configured to calculate a current value of a current flowing through the electric motor from an offset correction value obtained based on a first detection value detected at a time when a current flows through the current detection place and a second detection value detected at a time when a current does not flow through the current detection place, wherein the offset correction value includes: a first offset correction value stored in nonvolatile memory of the control unit at a time of assembling the electric motor control apparatus; and a second offset correction value computed by the control unit while the electric motor is driven, and wherein offset correction by the second offset correction value is made only when an absolute value of the second offset correction value is of a predetermined value or less.

8. The electric motor control apparatus according to claim 7, wherein the second offset correction value is limited within a predetermined range.

9. The electric motor control apparatus according to claim 7, wherein the electric motor driving unit is configured to drive the electric motor by a pulse width modulation signal, and wherein the second offset correction value is not updated when an on-duty value of this pulse width modulation signal is a predetermined value or more.

10. The electric motor control apparatus according to claim 7, wherein the second offset correction value is not updated when a number of rotations of the electric motor is a predetermined number or more.

11. The electric motor control apparatus according to claim 7, wherein the second offset correction value is not updated when the current value of the current flowing through the electric motor is a predetermined value or more.

12. The electric motor control apparatus according to claim 7, wherein the electric motor driving unit comprises a bridge circuit comprising bridge-connected switching element groups, wherein the electric motor driving unit is configured to drive the electric motor by controlling an on/off state of each switching element in the bridge circuit by a pulse width modulation signal, and wherein the detection place is a resistor connected between a ground and a switching element of a low potential side in at least one of the switching element group.

* * * * *